US008229656B2

(12) United States Patent
Ikushima et al.

(10) Patent No.: US 8,229,656 B2

(45) Date of Patent: Jul. 24, 2012

(54) ENGINE STARTING DEVICE

(75) Inventors: Yoshihiro Ikushima, Iida (JP); Kenichi Kinbara, Iida (JP)

(73) Assignee: OMRON Corporation, Kyoto (JP)

( * ) Notice: Subject to any disclaimer, the term of this patent is extended or adjusted under 35 U.S.C. 154(b) by 323 days.

(21) Appl. No.: 12/505,800

(22) Filed: Jul. 20, 2009

(65) Prior Publication Data

US 2010/0018489 A1 Jan. 28, 2010

(30) Foreign Application Priority Data

Jul. 23, 2008 (JP) ................................. 2008-189633

(51) Int. Cl.
*G06F 19/00* (2011.01)

(52) U.S. Cl. .................. 701/113; 123/179.3; 123/179.4; 307/10.6

(58) Field of Classification Search ............... 123/179.3, 123/179.4, 179.1, 179.5; 701/113, 102, 115; 73/114.58, 114.59, 114.61
See application file for complete search history.

(56) References Cited

U.S. PATENT DOCUMENTS

| | | | | |
|---|---|---|---|---|
| 5,122,723 | A * | 6/1992 | Sato | 320/123 |
| 5,323,102 | A * | 6/1994 | Torii et al. | 322/90 |
| 5,525,891 | A * | 6/1996 | Meyer et al. | 320/128 |
| 7,085,646 | B2 * | 8/2006 | Tanaka et al. | 701/113 |
| 7,216,617 | B2 | 5/2007 | Tanaka et al. | |
| 7,312,972 | B2 | 12/2007 | Hourai et al. | |
| 2005/0259482 | A1 | 11/2005 | Hourai et al. | |
| 2005/0287880 | A1 * | 12/2005 | Okuyama | 440/1 |
| 2006/0080027 | A1 | 4/2006 | Tanaka et al. | |
| 2008/0228337 | A1 * | 9/2008 | Bauerle et al. | 701/29 |
| 2010/0175656 | A1 * | 7/2010 | Doub | 123/179.3 |

FOREIGN PATENT DOCUMENTS

| | | | |
|---|---|---|---|
| JP | 401194863 | * | 8/1989 |
| JP | 2003061340 A | * | 2/2003 |
| JP | 2003-324959 A | | 11/2003 |

(Continued)

OTHER PUBLICATIONS

Office Action for Japanese Application No. 2008-189633, draft date Feb. 23, 2012, with English translation thereof (5 pages).

(Continued)

*Primary Examiner* — Stephen K Cronin
*Assistant Examiner* — Raza Najmuddin
(74) *Attorney, Agent, or Firm* — Osha Liang LLP

(57) ABSTRACT

An engine starting device for controlling an engine start of a vehicle by driving a starter relay of the vehicle with a battery of the vehicle as a power supply has a control processing unit and a step-up circuit for stepping up the output of the battery and outputting a drive voltage for driving the control processing unit and the starter relay. The control processing unit has a function of performing an engine start control of applying the drive voltage to the starter relay to activate the starter relay in time of the engine start at which an engine starting condition is satisfied The control processing unit performs a control function on the step-up circuit to activate the step-up circuit so that the drive voltage does not become lower than a minimum operation voltage of the starter relay in a predetermined period necessary to start the engine in time of the engine start, and activate the step-up circuit so that the drive voltage does not become lower than a first voltage value higher than a minimum operation voltage of the control processing unit and lower than the minimum operation voltage of the starter relay when not in the predetermined period.

4 Claims, 5 Drawing Sheets

FOREIGN PATENT DOCUMENTS

| | | | |
|---|---|---|---|
| JP | 2004-036494 | A | 2/2004 |
| JP | 2005-218159 | A | 8/2005 |
| JP | 2005-333768 | A | 12/2005 |
| JP | 2006-112243 | A | 4/2006 |

OTHER PUBLICATIONS

Patent Abstract for Japanese Publication No. 2003-324959 published Nov. 14, 2003 (1 page).

* cited by examiner

ENGINE STARTING DEVICE

BACKGROUND OF THE INVENTION

1. Technical Field

The present invention relates to an engine starting device capable of starting an engine of a vehicle at high reliability even in time of lowering of a battery output voltage.

2. Related Art

Conventionally, there are known a technique of arranging a step-up circuit for stepping up battery output of a vehicle to prevent drawbacks such as a main control unit (ECU; Electrical Control Unit) in the vehicle from being reset due to lowering of a battery voltage when starting an engine as described in Japanese Unexamined Patent Publication No. 2005-218159, and a technique of arranging a step-up circuit so that an engine can be started even in a kick method in a full track two-wheeled vehicle engine starting device as described in Japanese Unexamined Patent Publication No. 2004-36494.

In order to enhance the reliability of engine start in a vehicle equipped with an engine (internal combustion engine) as a drive source such as four-wheeled vehicle or two-wheeled vehicle, a control processing unit such as a microcomputer configuring a control unit for controlling the engine start needs to be prevented from breaking down by the lowering of the battery voltage, and a starter relay needs to be reliably activated by the control of the control unit even in time of lowering of the battery voltage. The starter relay is a relay for carrying current to a starter motor to forcibly activate (so-called cranking) the engine until the engine is in a completely exploded state (state in which the internal combustion engine can maintain the rotation with own force), and is generally referred to as a magnet switch. Unless the starter relay is activated, the starter motor obviously does not activate, and the engine does not start. Thus, a configuration of arranging the step-up circuit for stepping up the battery output, and driving the controller and the starter relay with the output of the step-up circuit as in the Japanese Unexamined Patent Publication No. 2005-218159 and Japanese Unexamined Patent Publication No. 2004-36494 is considered.

SUMMARY

In most cases, the minimum operation voltage of a starter relay is higher than the minimum operation voltage of the microcomputer and the like configuring the control unit. In other words, the step-up start voltage of the step-up circuit needs to be set higher than the minimum operation voltage of the starter relay when attempting to enhance the reliability of the engine start by simply arranging the step-up circuit. Thus, the extent and the frequency of the step-up operation that is unnecessarily performed other than in time of the engine start due to the lowering of the battery output voltage increase, thereby causing large negative effects from practical standpoint. That is, when the step-up operation by the step-up circuit is performed, the radiation noise occurs as an oscillation circuit in the step-up circuit is activated, and current consumption obviously increases. The extent and the occurrence frequency of the radiation noise and the increase in current consumption obviously increase the higher the step-up start voltage is set.

In order to overcome such negative effects, consideration is made in setting the step-up start voltage higher than the minimum operation voltage of the control unit and lower than the minimum operation voltage of the starter relay. In this case, the drawback in that the control unit breaks down or is reset by the lowering of the battery output voltage can be prevented, and furthermore, the extent and the occurrence frequency of the radiation noise and the increase in current consumption are small as the step-up start voltage is set low. However, when the battery output voltage becomes lower than the minimum operation voltage of the starter relay in time of the engine start, the control unit activates, but the starter relay does not activate, and the engine cannot be started.

One or more embodiments of the present invention provides an engine starting device capable of starting an engine of a vehicle at high reliability by a step-up operation even in time of lowering of a battery output voltage, and suppressing radiation noise and increase in current consumption involved in the step-up operation to a minimum.

In accordance with one aspect of the present invention, there is provided an engine starting device for controlling an engine start of a vehicle by driving a starter relay of the vehicle with a battery of the vehicle as a power supply; the device including: a control processing unit, and a step-up circuit for stepping up the output of the battery and outputting a drive voltage for driving the control processing unit and the starter relay; wherein the control processing unit has a function of performing an engine start control of applying the drive voltage to the starter relay to activate the starter relay in time of the engine start at which an engine starting condition is satisfied; and the control processing unit performs a control function on the step-up circuit to activate the step-up circuit so that the drive voltage does not become lower than a minimum operation voltage of the starter relay in a predetermined period necessary to start the engine in time of the engine start, and activate the step-up circuit so that the drive voltage does not become lower than a first voltage value higher than a minimum operation voltage of the control processing unit and lower than the minimum operation voltage of the starter relay when not in the predetermined period.

In this case, a starting time of the "predetermined period" is either one of a time point at which the engine start control is started (including time immediately before and after, this also applies to the following) or a time point at which the engine starting condition is satisfied. An ending time of the "predetermined period" is one of a time point at which the start of the engine is recognized, a time point at which the engine start control is stopped, a time point at which the engine starting condition becomes not satisfied from satisfied, or a time point at which a set time has elapsed from the starting time of the predetermined period.

According to the engine starting device according to one ore more embodiments of the present invention, the step-up circuit activates such that the drive voltage does not become lower than the first voltage value higher than the minimum operation voltage of the control processing unit and lower than the minimum operation voltage of the starter relay when not in the predetermined period in time of the engine start. That is, the step-up operation is not performed unless the battery output voltage is smaller than or equal to the first voltage value or the step-up start voltage. Thus, when not in the predetermined period in time of the engine start, only the minimum step-up operation for preventing breakdown and reset of the control processing unit by the lowering of the battery voltage is performed.

In the predetermined period, the step-up circuit activates such that the drive voltage does not become lower than the minimum operation voltage of the starter relay. Thus, in at least the predetermined period in time of the engine start, the drive voltage reliably becomes greater than or equal to the minimum operation voltage of the starter relay, so that the starter relay reliably activates and the cranking operation for the engine start is reliably performed.

Therefore, according to the present device, the engine of the vehicle can be started at high reliability by the step-up operation in time of lowering of the battery output voltage, and radiation noise and increase in current consumption involved in the step-up operation can be suppressed to a minimum.

According to a preferred aspect of the engine starting device of the present application, the step-up circuit executes a step-up operation for stepping up the output of the battery when the drive voltage becomes smaller than or equal to a step-up start voltage, and stops the step-up operation when the drive voltage becomes greater than the step-up start voltage; the step-up start voltage of the step-up circuit is switchable to a second voltage value of greater than or equal to the minimum operation voltage of the starter relay or the first voltage value by the control processing unit; and the control processing unit realizes a control function on the step-up circuit by performing a step-up switching control of having the step-up start voltage as the first voltage value when not in the predetermined period, and switching the step-up start voltage to the second voltage value in the predetermined period when at least the output voltage is lower than the minimum operation voltage of the starter relay.

According to such an aspect, the control function on the step-up circuit can be realized by simply having the control processing unit switch the step-up start voltage of the step-up circuit, and thus the control process of the control processing unit is simplified.

According to another preferred aspect of the engine starting device of the present application, the step-up circuit includes an ON terminal for inputting a signal voltage for permitting the step-up operation, and executes the step-up operation when the signal voltage applied to the ON terminal becomes smaller than or equal to a predetermined voltage value and stops the step-up operation when the signal voltage becomes greater than the predetermined voltage value; a step-up control circuit for applying a voltage obtained by voltage dividing the drive voltage output by the step-up circuit to the ON terminal as the signal voltage is arranged; the step-up control circuit includes a first resistor connected between a drive power supply line applied with the drive voltage and the ON terminal, a second resistor connected between a low potential side power supply line connected to a negative pole of the battery and the ON terminal, and a third resistor and a switching element sequentially connected in series between the low potential side power supply line and the ON terminal so as to be in a parallel relationship with the second resistor; when the switching element is turned OFF, a first voltage divided state is obtained in which the drive voltage is voltage divided by the first resistor and the second resistor so that the signal voltage becomes the predetermined voltage value when the drive voltage is at the first voltage value, when the switching element is turned ON, a second voltage divided state is obtained in which the drive voltage is voltage divided by the first resistor, the second resistor, and the third resistor so that the signal voltage becomes the predetermined voltage value when the drive voltage is at the second voltage value; and the control processing unit controls the ON/OFF state of the switching element to switch the step-up control circuit to the first voltage divided state or the second voltage divided state, thereby switching the step-up start voltage to the first voltage value or the second voltage value realizing the step-up switching control.

According to such an aspect, fine setting of the first voltage value and the second voltage, which are the step-up start voltage, is facilitated by the setting or the change in setting of the resistance value of each resistor (first resistor to third resistor) of the step-up control circuit.

BRIEF DESCRIPTION OF THE DRAWINGS

FIG. 3A is the case of the present example, and FIG. 3B is a comparative example when the present invention is not applied;

DETAILED DESCRIPTION

According to the engine starting device of the present application, the engine of the vehicle can be started at high reliability by the step-up operation in time of lowering of the battery output voltage, and radiation noise and increase in current consumption involved in the step-up operation can be suppressed to a minimum.

Hereinafter, each example of the embodiment of the present invention will be described with reference to the drawings.

First Example

Figure 1:
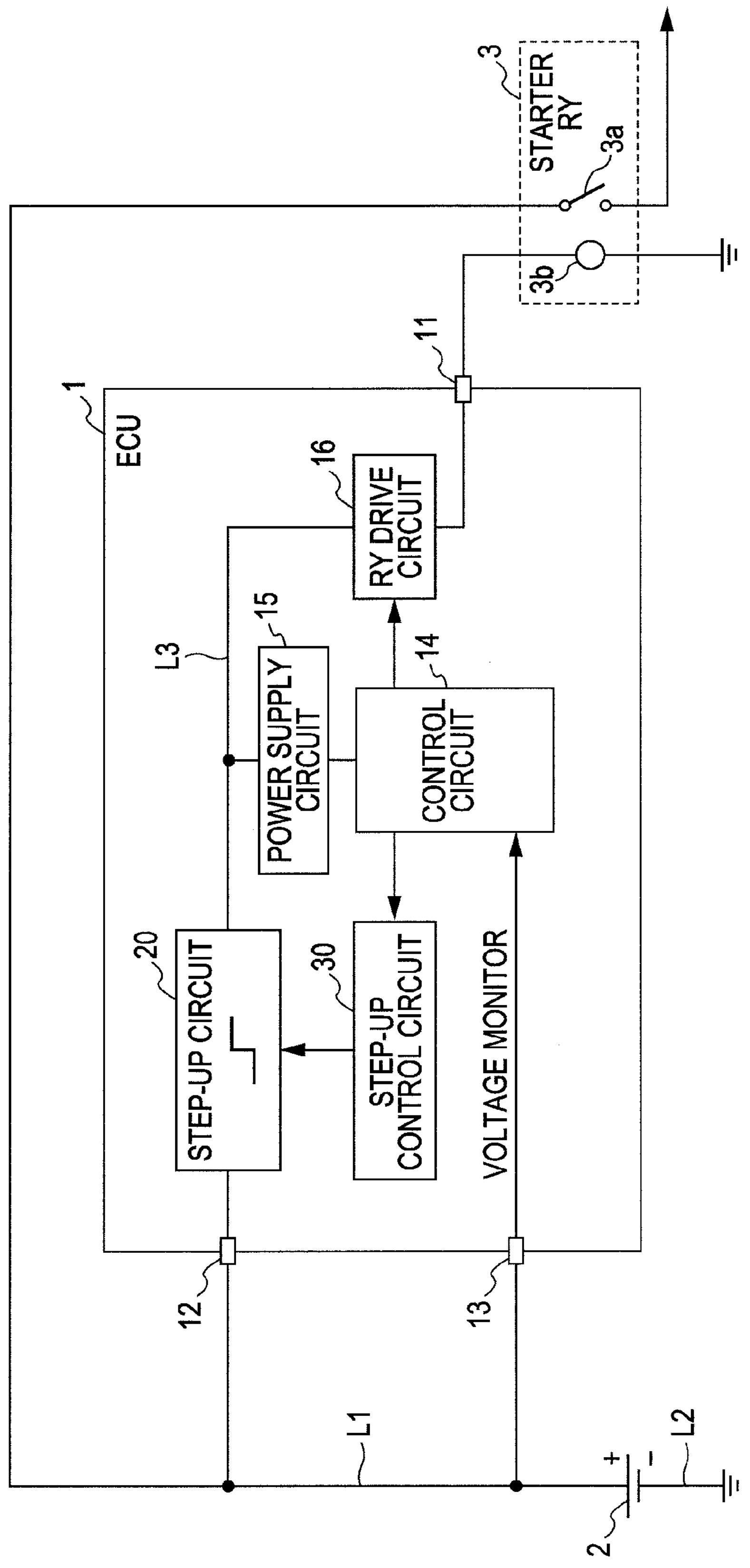
FIG. 1 is a circuit diagram showing an overall configuration of an engine starting device of the present example.
Figure 2:
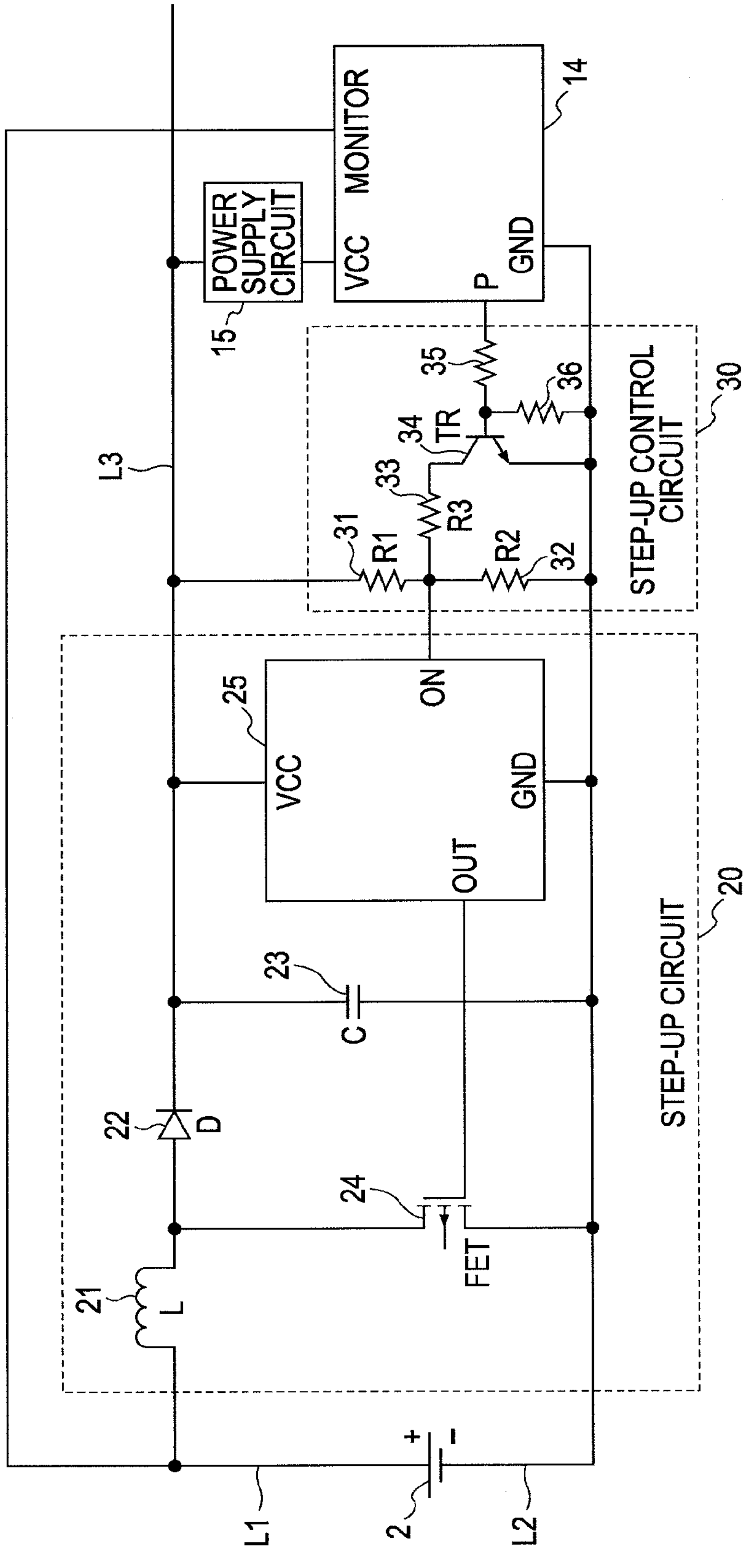
FIG. 2 is a circuit diagram showing a detailed configuration of main parts of the engine starting device.

First, a first example will be described. FIG. 1 is a circuit diagram showing an overall configuration of an engine starting device of the present example. FIG. 2 is a circuit diagram showing a detailed configuration of main parts of the engine starting device.

Reference number 1 in FIG. 1 is a control unit (ECU) for engine start. In the present example, the control unit 1 corresponds to the engine starting device according to one or more embodiments of the present invention, and incorporates a step-up circuit 20 and a step-up control circuit 30, to be hereinafter described. The step-up circuit 20, and the like to be hereinafter described may be arranged as a separate unit at the exterior of the control unit 1, and the engine starting device according to one or more embodiments of the present invention may be configured with all of the above. In the present example, a mode in which the step-up circuit 20 and the like are incorporated in the control unit 1 is illustrated.

In FIG. 1, reference number 2 is a battery of a vehicle, and reference number 3 is a starter relay (denoted as starter relay RY in the figure). Reference numbers L1 to L3 are main conductive lines (formed by electrical wire and conductor pattern etc. on a substrate, portion of substantially same potential) in the present device. Reference number L1 is a high potential side power supply line connected to the positive pole of the battery 2, reference number L2 is a low potential side power supply line connected to the negative pole of the battery 2, and reference number L3 is a drive power supply line applied with the output voltage of the step-up circuit 20. The low potential side power supply line L2 is connected to a ground (portion of ground potential in the vehicle) as shown in FIG. 1 to constantly have a ground potential. The voltage of the high potential side power supply line L1 is obviously the output voltage of the battery 2, and the voltage of the drive power supply line L3 is the output voltage of the step-up circuit 20 (i.e., drive voltage according to one or more embodiments of the present invention). In a state in which the step-up circuit 20 is not performing a step-up operation as hereinafter described, the voltage of the high potential side power supply line L1 (output voltage of the battery 2) and the voltage of the drive power supply line L3 (drive voltage) are equal.

As shown in FIG. 1, a contact 3*a* of the starter relay 3 is a constantly opened contact, and is connected between the high potential side power supply line L1 and a power supply input terminal of the starter motor (not shown). An excitation coil 3*b* of the starter relay 3 is connected between an output terminal 11 of the control unit 1 and the ground. Thus, the contact 3*a* of the starter relay 3 closes when a voltage of greater than or equal to a minimum operation voltage (e.g., 10 V) of the starter relay 3 is applied to the output terminal 11. When the contact 3*a* closes, the output voltage of the battery 2 (voltage of the high potential side power supply line L1) is applied on the power supply input terminal of the starter motor (not shown), so that the starter motor is in a current-flowing state (i.e., activated state). When the starter motor is in the current flowing state, the cranking of the engine is carried out.

The control unit 1 includes the output terminal 11 and two input terminals 12, 13 with respect to the outside of the unit. The input terminals 12, 13 are both connected to the high potential side power supply line L1 (i.e., positive pole of the battery 2), where such input terminals may be integrated to one terminal.

The control unit 1 includes a control circuit 14, a power supply circuit 15, a relay drive circuit 16 (denoted as RY drive circuit in the figure), the step-up circuit 20, and a step-up control circuit 30.

The control circuit 14 is a circuit including the microcomputer etc., and includes a P terminal, a VCC terminal, a GND terminal, and a MONITOR terminal, as shown in FIG. 2. The P terminal is a terminal for outputting the control voltage to the step-up control circuit 30. The VCC terminal is the power supply input terminal, and is connected to the output terminal of the power supply circuit 15. The GND terminal is a terminal connected to the low potential side power supply line L2 (i.e., the negative pole of the battery 2). The MONITOR terminal is a terminal connected to the high potential side power supply line L1.

The control circuit 14 corresponds to a control processing unit according to one or more embodiments of the present invention, and is activated by the power (output of the power supply circuit 15) input from the VCC terminal to realize the following control functions. First, The control circuit 14 has a function of performing the engine start control of activating the relay drive circuit 16 to activate the starter relay 3 (i.e., obtain a state in which the contact 3*a* is closed) in time of the engine start (when engine starting condition to be hereinafter described is satisfied). The control circuit 14 also has a function of controlling the step-up circuit 20 (control function with respect to the step-up circuit) through the step-up control circuit 30. The control function with respect to the step-up circuit (hereinafter referred to as a step-up control function) refers to the control function of activating the step-up circuit 20 such that the drive voltage (output voltage of the step-up circuit 20) does not become lower than the minimum operation voltage of the starter relay 3 in a predetermined period necessary to start the engine in time of the engine start, and activating the step-up circuit 20 such that the drive voltage does not become lower than the first voltage value when not in the predetermined period. The first voltage value is a voltage value (e.g., 8 V) set in advance in a range greater than or equal to the minimum operation voltage of the control circuit 14 and lower than the minimum operation voltage (e.g., 10 V) of the starter relay 3. The details of the step-up control function will be hereinafter described.

The power supply circuit 15 is a circuit connected between the drive power supply line L3 and the VCC terminal, and is a circuit for outputting to the VCC terminal the voltage in which the necessary process (e.g., voltage stabilization process or voltage conversion process) is applied on the voltage of the drive power supply line L3 (drive voltage) as the power supply voltage of the control circuit 14. That is, the power supply circuit 15 is a circuit for generating a power supply voltage necessary for driving the control circuit 14 based on the output of the step-up circuit 20. In other words, the control circuit 14 is driven by the output voltage (drive voltage) of the step-up circuit 20 through the power supply circuit 15.

The relay drive circuit 16 is a circuit (e.g., circuit including switching element such as transistor) connected between the drive power supply line L3 and the output terminal 11, described above, for having the drive power supply line L3 and the output terminal 11 in a connected state or a non-connected state by the control of the control circuit 14. The control circuit 14 is arranged with a relay drive signal terminal (not shown) output with the signal voltage for controlling the relay drive circuit 16. The control circuit 14 controls the relay drive circuit 16 by switching the voltage of the relay drive signal terminal, and performs the engine start control described above.

As shown in FIG. 2, the step-up circuit 20 is configured by a coil 21 (L), a diode 22 (D), a capacitor 23 (C), a FET 24 (FET), and a frequency oscillation IC 25 (IC).

The frequency oscillation IC 25 includes an OUT terminal, a VCC terminal, a GND terminal, and an ON terminal. The OUT terminal is a terminal, connected to a gate of the FET 24, for outputting the gate voltage of the FET 24. The VCC terminal is a power supply input terminal, and is connected to the drive power supply line L3. That is, the frequency oscillation IC 25 is activated with the drive voltage (output voltage of the step-up circuit 20) as the power supply. The GND terminal is a terminal connected to the low potential side power supply line L2. The ON terminal is a terminal connected to the step-up control circuit 30.

An output command (permit) of the OUT terminal is performed if the signal voltage applied to the ON terminal is smaller than or equal to a predetermined voltage value (e.g., 5 V), and the frequency oscillation IC 25 is in an activation state in which the output voltage of the OUT terminal changes at a predetermined frequency to repeat high level and low level. When the frequency oscillation IC 25 is in the activation state, the FET 24 repeats ON/OFF at the predetermined frequency, and the step-up operation in which the voltage (i.e., drive voltage) of the drive power supply line L3 is stepped up than the voltage (i.e., output voltage of battery 2) of the high potential side power supply line L1 is realized by the action of the coil 21 (L), the diode 22 (D), and the capacitor 23 (C).

Since the output command (permit) of the OUT terminal is not performed if the signal voltage applied to the ON terminal is greater than the predetermined voltage value, the frequency oscillation IC 25 is in an inactivation state in which the output voltage of the OUT terminal is maintained at low level. When the frequency oscillation IC 25 is in the inactivation state, the FET 24 is maintained in the OFF state, and thus the voltage (i.e., drive voltage) of the drive power supply line L3 becomes equal to the voltage (i.e., output voltage of battery 2) of the high potential side power supply line L1.

In other words, the step-up circuit 20 includes an ON terminal (in this case, ON terminal of the frequency oscillation IC 25) for inputting the signal voltage permitting the step-up operation, where the step-up operation is executed when the signal voltage applied to the ON terminal becomes smaller than or equal to a predetermined voltage value, and the step-up operation is stopped when the signal voltage becomes greater than the predetermined voltage value.

The step-up control circuit 30 includes a first resistor 31 (R1) connected between the drive power supply line L3 and the ON terminal, a second resistor 32 (R2) connected between the lower potential side power supply line L2 and the ON terminal, and a third transistor 33 (R3) and a transistor 34 (TR) sequentially connected in series between the low potential side power supply line L2 and the ON terminal so as to be in a parallel relationship with the second resistor 32, and voltage dividing resistors 35, 36 for driving the transistor 34. The transistor 34 corresponds to the switching element according to one or more embodiments of the present invention. The voltage dividing resistor 35 is a resistor connected between the P terminal of the control circuit 14 and the base of the transistor 34. The voltage dividing resistor 36 is a resistor connected between the base of the transistor 34 and the low potential side power supply line L2.

The transistor 34 is turned ON when the control voltage output to the P terminal of the control circuit 14 becomes H level, and the transistor 34 is turned OFF when the control voltage output to the P terminal becomes L level. In other words, the operation of the transistor 34 (switching element) is controlled by the control circuit 14 by the switching of the control voltage (voltage of P terminal).

The first resistor 31 (R1), the second resistor 32 (R2), and the third resistor 33 (R3) are resistors for voltage dividing the drive voltage (voltage of the drive power supply line L3), and generating the signal voltage (voltage of the ON terminal). The resistance values of such resistors are set such that the following operation of the step-up control circuit 30 can be realized. When the transistor 34 is turned OFF, a first voltage dividing state is obtained in which the drive voltage is voltage divided by the first resistor 31 and the second resistor 32 such that the signal voltage becomes the predetermined voltage value when the drive voltage is at the first voltage value. When the transistor 34 is turned ON, a second voltage dividing state is obtained in which the drive voltage is voltage divided by the first resistor 31, the second resistor 32, and the third resistor 33 such that the signal voltage becomes the predetermined voltage value when the drive voltage is at the second voltage value.

That is, when the transistor 34 is turned OFF, the third resistor 33 is separated from the low potential side power supply line L2, and thus the first voltage divided state in which voltage obtained by voltage dividing the drive voltage by the first resistor 31 and the second resistor 32 becomes the signal voltage is obtained. In the first voltage divided state, the resistance values of the first resistor 31 and the second resistor 32 are set such that the signal voltage becomes the predetermined voltage value (e.g., 5 V) when the drive voltage is at the first voltage value (e.g. 8 V).

When the transistor 34 is turned ON, the third resistor 33 is connected to the low potential side power supply line L2, and thus the second voltage divided state in which voltage obtained by voltage dividing the drive voltage by the first resistor 31, the second resistor 32, and the third resistor 33 becomes the signal voltage is obtained. In the second voltage divided state, the resistance values of the first resistor 31, the second resistor 32, and the third resistor 33 are set such that the signal voltage becomes the predetermined voltage value (e.g., 5 V) when the drive voltage is at the second voltage value (e.g. 11 V).

Therefore, in a state the transistor 34 is turned OFF (i.e., first voltage divided state), the step-up operation of the step-up circuit 20 is executed when the drive voltage becomes smaller than or equal to the first voltage value, and the step-up operation of the step-up circuit 20 is stopped when the drive voltage becomes greater than the first voltage value.

In a state the transistor 34 is turned ON (i.e., second voltage divided state), the step-up operation of the step-up circuit 20 is executed when the drive voltage becomes smaller than or equal to the second voltage value, and the step-up operation of the step-up circuit 20 is stopped when the drive voltage becomes greater than the second voltage value.

The second voltage value is a voltage value (e.g., 11 V) set in advance in a range of greater than or equal to the minimum operation voltage (e.g., 10 V) of the starter relay 3.

The functions of the present device related to the step-up circuit 20 described above will be described below from a different standpoint.

The step-up circuit 20 of the present device executes the step-up operation of stepping up the output of the battery 2 when the output voltage (drive voltage) of the step-up circuit 20 becomes smaller than or equal to the step-up start voltage, and stops the step-up operation when the output voltage (drive voltage) of the step-up circuit 20 becomes greater than the step-up start voltage. The step-up start voltage can be switched to the first voltage value or the second voltage value by the control of the control circuit 14 (in this case, control of transistor 34).

The details of the step-up control function of the control circuit 14 (control processing unit) will be described below. In the case of the present example, the control circuit 14 realizes the step-up control function described above in the following manner. When not at the predetermined time in time of the engine start, the step-up start voltage is maintained at the first voltage value by maintaining the transistor 34 in the OFF state (step-up control circuit 30 is in the first voltage divided state) with the control voltage (output voltage of the P terminal) as the L level. When the output voltage (voltage of the MONITOR terminal) of at least the battery 2 is lower than the minimum operation voltage of the starter relay 3, the step-up start voltage is switched to the second voltage value by having the control voltage (output voltage of the P terminal) at the H level and the transistor 34 in the ON state (step-up control circuit 30 is in the second voltage divided state) at the predetermined time in time of the engine start. Specifically, the step-up start voltage is switched to the second voltage value in step S3 in a flowchart of FIG. 4, to be hereinafter described. Thus, the control circuit 14 realizes the step-up control function by performing the control of switching the step-up start voltage (step-up switching control).

One example of the control processing procedure of the control circuit 14 will be described with the flowchart shown in FIG. 4.

Figure 4:
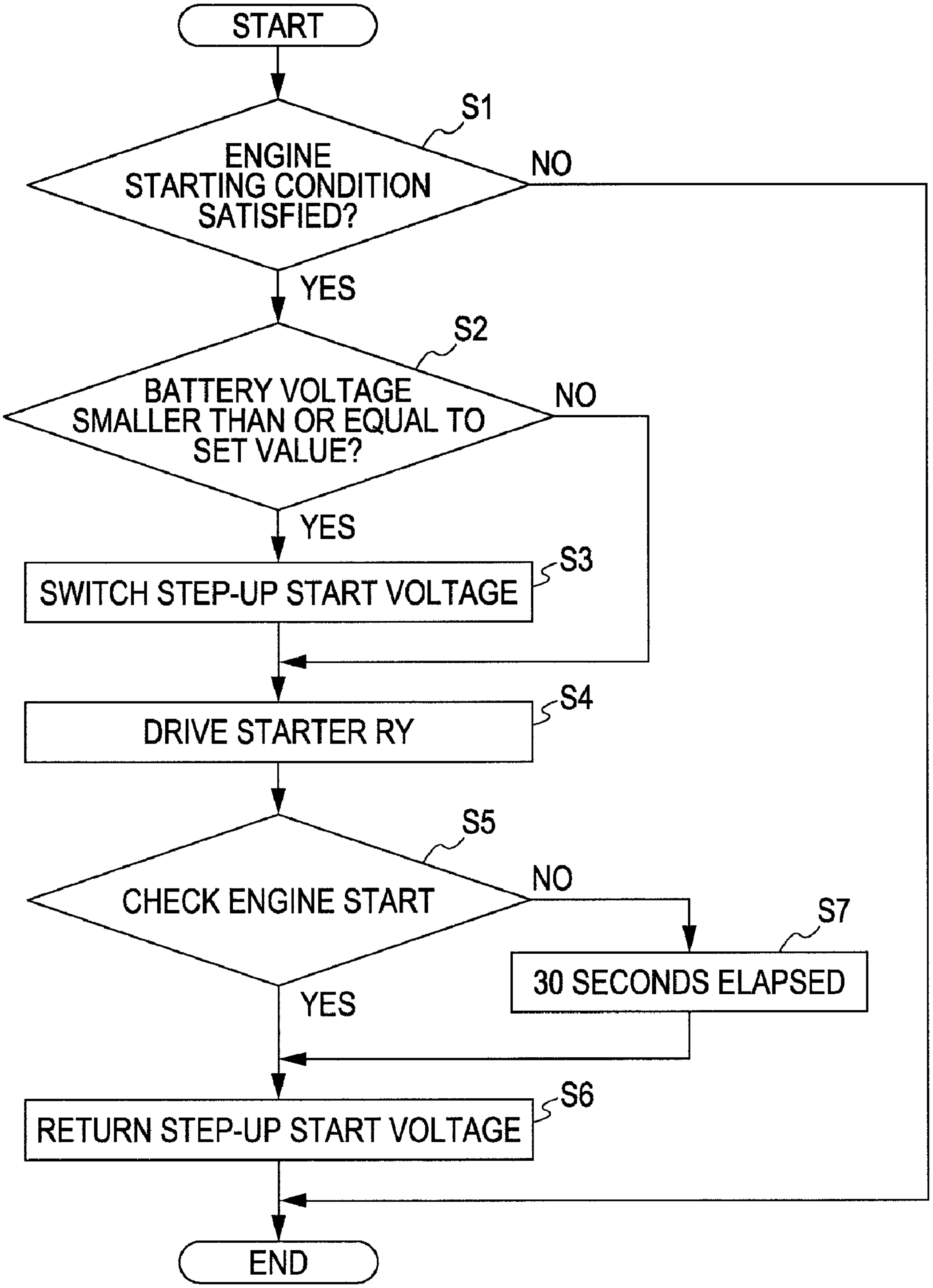
FIG. 4 is a flowchart showing a control process of a control processing unit.

The control circuit 14 periodically starts the routine of FIG. 4, where whether or not the engine starting condition is satisfied is first determined in step S1. The engine starting condition is satisfied when the following conditions (1) to (4) are all met. (1) In a case of AT vehicle (vehicle of automatic gear shifting type), the shift position of the automatic shift is at P (parking) or N (neutral). (2) In a case of MT vehicle (vehicle of manual gear shifting type), the clutch is pressed down. (3) Brake is pressed down. (4) Ignition switch of the vehicle (engine start switch) is ON operated. In particular, the condition of (3) may not be provided. The process proceeds to step S2 if the engine starting condition is satisfied, and the routine is terminated if the condition is not satisfied. Various types of information (e.g., signal indicating that ignition switch of the vehicle (engine start switch) is ON operated) for determining the engine starting condition is input to the control circuit 14 from another controller in the vehicle.

In step S2, the voltage of the MONITOR terminal is read to determine whether or not the output voltage of the battery 2 (voltage of the high potential side power supply line L1) is smaller than or equal to the set value (specifically, smaller than or equal to the minimum operation voltage of the starter relay 3), where the process proceeds to step S3 if smaller than or equal to the set value, and the process proceeds to step S4 if not smaller than or equal to the set value.

In step S3, the transistor 34 is turned ON (step-up control circuit 30 is in the second voltage divided state) to execute the step-up switching control of switching the step-up start voltage to the second voltage value, and the process proceeds to step S4.

In step S4, the relay drive circuit 16 is activated by switching the voltage of the relay drive signal terminal to perform the engine start control. In other words, the relay drive circuit 16 is activated to have the drive power supply line L3 and the output terminal 11 in the connected state, so that the drive voltage is applied to the excitation coil 3*b* of the starter relay 3 and the activation of the starter relay 3 (i.e., engine start control) is controlled. The state in which the relay drive circuit 16 is activated to activate the starter relay 3 (state in which the drive voltage is applied to the excitation coil 3*b*) continues until the engine starting condition is not satisfied. On the contrary, when the ON operation of the ignition switch of the vehicle (engine start switch) is canceled, the engine start control started in step S4 is stopped (i.e., the relay drive circuit 16 is returned to the inactivation state).

After step S4, the process proceeds to step S5, where whether or not the engine has started is determined, and the process proceeds to step S6 if determined that the engine has started and the process proceeds to step S7 if not determined that the engine has started. In the determination on whether or not the engine has started, the engine may be determined as started if the ON operation of the ignition switch of the vehicle (engine start switch) is canceled. Alternatively, the information (e.g., signal indicating that engine is in the completely exploded state, etc.) related to the engine of the vehicle input to the control circuit 14 from another controller in the vehicle may be read, and whether or not the engine has started may be determined based on such information (e.g., determination is made that the engine has started if the signal indicating that the engine is in the completely exploded state is input).

In step S6, the transistor 34 is returned to the OFF state (the step-up control circuit 30 is in the first voltage divided state) if step S3 is executed to return the step-up start voltage to the first voltage value (i.e., state of the step-up switching control started in step S3 is returned to the normal state), and the routine is thereafter terminated.

In step S7, the process does not proceed for a preset time (e.g., 30 seconds) and the process proceeds to step S6 after elapse of the set time.

According to the routine of FIG. 4 described above, the process of step S3 is performed immediately before the engine start control (step S4) so that the drive voltage is stepped up to the second voltage value when the output voltage of the battery 2 is smaller than or equal to the set value (specifically, smaller than or equal to the minimum operation voltage of the starter relay 3) when the engine starting condition is satisfied. In other words, when the transistor 34 is turned ON by the process of step S3 (the step-up control circuit 30 is in the second voltage divided state), the step-up operation of the step-up circuit 20 is executed when the drive voltage becomes smaller than or equal to the second voltage value and the step-up operation of the step-up circuit 20 is stopped when the drive voltage becomes greater than the second voltage value, as described above. That is, the step-up operation is performed until the drive voltage becomes greater than the second voltage value if the drive voltage is smaller than or equal to the second voltage value. In this case, the process of step S3 is performed when the determination of step S2 is positive, and thus the drive voltage is smaller than or equal to the minimum operation voltage of the starter relay 3 and obviously smaller than the second voltage value at the time point the process proceeds from step S2 to step S3. Thus, when the control process of step S3 is performed, the step-up operation of the step-up circuit 20 (operation in which the frequency oscillation IC 25 is in the activation state and the FET 24 repeats ON/OFF at a predetermined frequency) is immediately executed and the drive voltage is instantaneously stepped up to the second voltage value.

After the step-up operation to the second voltage value is performed as necessary, the engine start control (drive of the starter relay 3) is performed in step S4, and the engine is reliably cranked. The state in which the drive voltage is stepped up to the second voltage value is immediately canceled if the start of the engine is recognized and is canceled after elapse of the set time (e.g., 30 seconds) if the start of engine is not recognized through steps S5 to S7.

According to the engine starting device (control unit 1) described above, the transistor 34 is in the OFF state (the step-up control circuit 30 is in the first voltage divided state) at normal time excluding the predetermined period in time of the engine start by the control of the control circuit 14, and thus the step-up operation of the step-up circuit 20 is executed when the drive voltage becomes smaller than or equal to the first voltage value (e.g., 8 V), and the step-up operation of the step-up circuit 20 is stopped when the drive voltage (voltage of the drive power supply line L3) becomes greater than the first voltage value. Thus, as shown on the left side in FIG. 3A, the step-up operation is performed such that the drive voltage is maintained at the first voltage value when the output voltage of the battery 2 becomes smaller than or equal to the first voltage value or the step-up start voltage. That is, the step-up operation is not performed unless the output voltage of the battery 2 becomes smaller than or equal to the first voltage value or the step-up start voltage. Thus, only the minimum step-up operation for preventing breakdown and reset of the control circuit 14 (control processing unit) by lowering of the battery voltage is performed at normal times excluding the predetermined period in time of the engine start. Generally, the battery voltage of the automobile etc. barely lowers to around the minimum operation voltage of the microcomputer etc. configuring the control circuit 14, and thus the frequency of execution of the step-up operation at other than in time of the engine start lowers extremely.

In the predetermined period in time of the engine start (in this case, from immediately before the start of drive of the starter relay 3 by the engine start control to the time point when the start of engine is recognized or the time point when the set time is elapsed), the step-up circuit 20 is activated such that the drive voltage does not becomes smaller than the minimum operation voltage of the starter relay 3. That is, according to the control process shown in FIG. 4 of the control circuit 14, if the output voltage of the battery 2 is smaller than or equal to the minimum operation voltage of the starter relay 3, the step-up switching control (step S3) of switching the transistor 34 to the ON state (the step-up control circuit 30 is in the second voltage divided state) is executed immediately before the engine start control (step 4), so that the step-up operation of stepping up the drive voltage to the second voltage value (e.g., 11 V) is executed. Thus, as shown on the right side of FIG. 3A, in at least the predetermined period in time of the engine start, the drive voltage is reliably greater than or equal to the minimum operation voltage of the starter relay 3, the contact 3*a* of the starter relay 3 is reliably closed, and the cranking operation for starting the engine is reliably carried out.

Therefore, according to the present device, the engine of the vehicle can be started at high reliability by the step-up operation in time of lowering of the battery output voltage, and radiation noise and increase in current consumption involved in the step-up operation can be suppressed to a minimum.

Figure 3A:
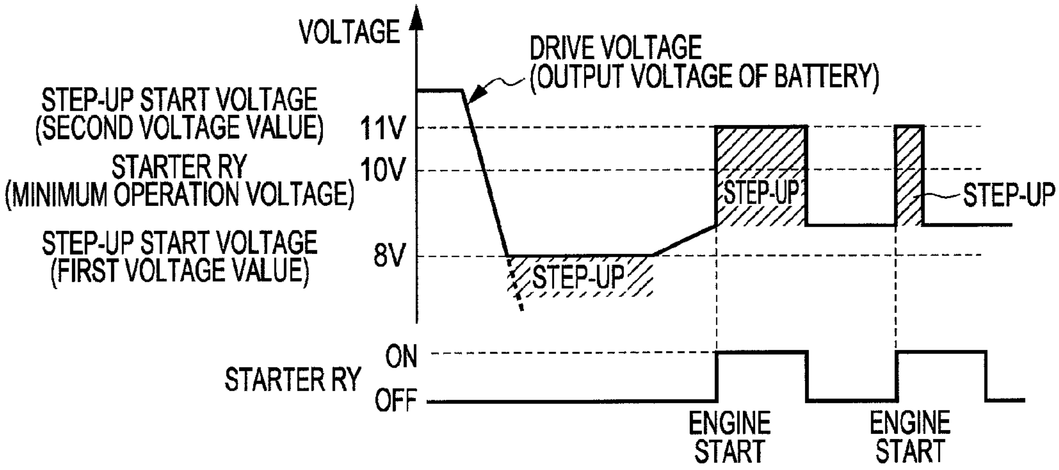
FIGS. 3A and 3B are views for describing an operation of the engine starting device, where
Figure 3B:
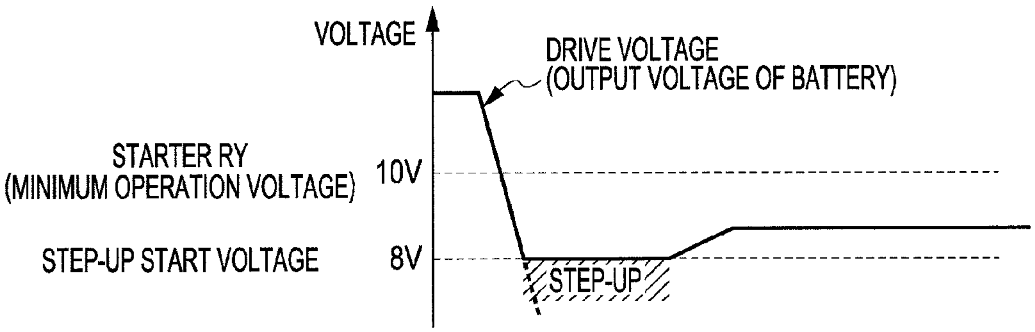

FIG. 3B is a comparative example in a case where the step-up start voltage is fixed at the first voltage value. In this case, the drive voltage does not become smaller than the first voltage value, and thus the breakdown and the reset of the control circuit 14 (control processing unit) can be prevented. However, if the output voltage of the battery 2 is smaller than or equal to the minimum operation voltage of the starter relay 3, the control circuit 14 will function but the starter relay 3 cannot be driven due to lack of drive voltage, and thus the engine may not start.

The device of the present example, on the other hand, switches the step-up start voltage to the second voltage value in the predetermined period in time of the engine start, as necessary, and steps up the drive voltage to the second voltage value.

Two types of modes of the predetermined period in which the drive voltage is stepped up to the second voltage value are shown on the right side of FIG. 3A. One type (displayed at relatively middle in the left and right direction of the figure) is an example in which the predetermined period and the activation period of the starter relay 3 (period in which the engine start control is performed) are coincided. The other type (displayed relatively on the right side in the left and right direction of FIG. 1) is an example in which the ending time of the predetermined period is earlier than the ending time of the activation period of the starter relay 3 (e.g., when the check of the engine start is performed in the middle of the activation period of the starter relay 3). Thus, various types of modes of the predetermined period can be considered. For instance, a mode in which the predetermined period starts earlier than the activation period of the starter relay 3, and a mode in which the predetermined period ends later than the activation period of the starter relay 3.

The device of the present example has the following effects.

The present device has an advantage in that the step-up control function can be realized by having the control circuit 14 simply switch the step-up start voltage of the step-up circuit 20 to the first voltage value or the second voltage value, and thus the control process of the control circuit 14 can be simplified.

The present device includes the step-up control circuit 30, as described above, and has a configuration in which the step-up start voltage of the step-up circuit 20 is switched through the step-up control circuit 30. Thus, the fine setting of the first voltage value and the second voltage value or the step-up start voltage is facilitated by the setting or the change in setting of the resistance value of each resistor (first resistor 31 to third resistor 33) of the step-up control circuit 30. The minimum operation voltage of the starter relay 3 and the control circuit 14 actually changes according to the conditions of ambient temperature and the like. Thus, the minimum value of the minimum operation voltage needs to be assumed to finely set the first voltage value and the second voltage value with respect to the usage condition so that the above-described effects can be obtained even under the worst condition. The device of the present example enables the fine setting of the first voltage value and the second voltage value to be easily carried out by the setting of the resistance value.

Second Example

Figure 5:
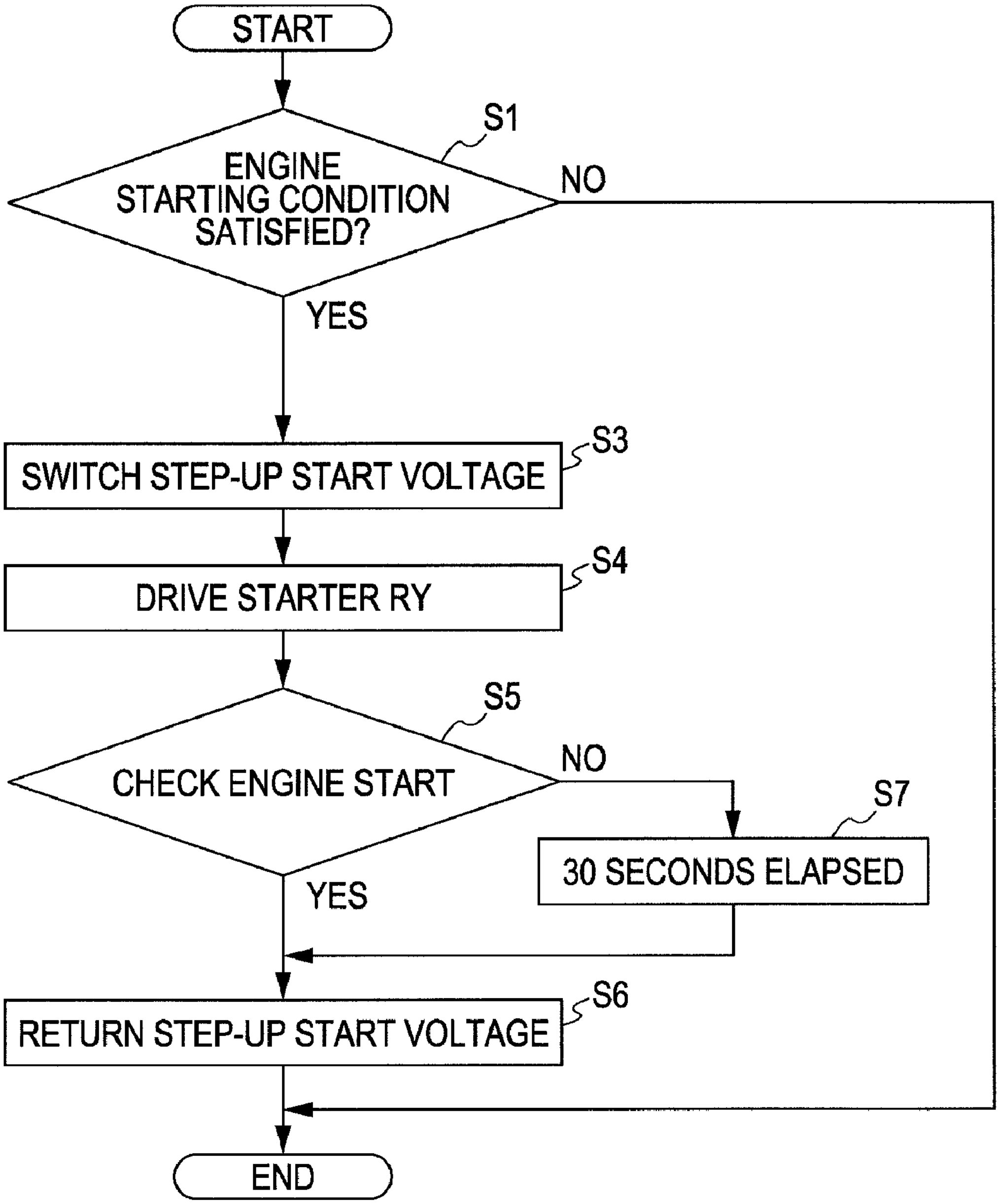
FIG. 5 is a flowchart showing the control process (another example) of the control processing unit.

The second example will be described below. This example is a mode in which the step-up start voltage is unconditionally switched to the second voltage value in time of the engine start without monitoring the output voltage of the battery 2. FIG. 5 shows the processing procedure (flowchart) of the control circuit 14 for this case. In FIG. 5, step S2 in FIG. 4 is omitted, and the processing contents of other steps are the same as in FIG. 4. However, if the determination result of step S1 is positive, the process proceeds to step S3. The circuit configuration of the present example may be similar to the first example. However, since the output voltage of the battery 2 is not monitored, the MONITOR terminal of the control circuit 14 shown in FIG. 2 can be omitted in the present example.

In the case of the present example, the step-up start voltage is unconditionally switched to the second voltage value when the engine starting condition is satisfied. Thus, if the output voltage of the battery 2 is smaller than or equal to the second voltage value (e.g., 11 V) at the time point the engine starting condition is satisfied, the step-up operation is executed even if greater than the minimum operation voltage (e.g., 10 V) of the starter relay 3 and the drive voltage is stepped up to the second voltage value.

One or more embodiments of the present invention may adopt such a mode, in which case the effects similar to the first example are also obtained. In the case of the second example, however, the control process is simplified as step S2 is omitted but the frequency the step-up operation to the second voltage value is executed tends to slightly increase compared to the first example, and thus the first example is superior in such aspect.

The present invention is not limited to the above examples, and various modifications and applications can be considered.

For instance, in the example described above, the step-up start voltage is switched to the second voltage, as necessary (or unconditionally) immediately before driving the starter relay, and the step-up start voltage is returned to the first voltage value when the start of the engine is recognized or when the set time has elapsed. In other words, in the example described above, a case has been described in which the starting time of the predetermined period according to one or more embodiments of the present invention (period of activating the step-up circuit such that the drive voltage does not become smaller than the minimum operation voltage of the starter relay, specifically, the period of switching the step-up start voltage to the second voltage value) is immediately before the start of drive of the starter relay (immediately after the engine starting condition is satisfied), and the ending time of the predetermined period is the time point the start of the engine is recognized or the time point the set time is elapsed. However, the present invention is not limited thereto. For instance, the entire period in which the engine start control (control of activating the relay drive circuit 16) is being performed may be the predetermined period according to one or more embodiments of the present invention, and the step-up start voltage may be continuously set to the second voltage value, as necessary (or unconditionally) during the period of performing the engine start control. Alternatively, the entire period in which the engine starting condition is satisfied may be the predetermined period according to one or more embodiments of the present invention, and the step-up start voltage may be continuously set to the second voltage value, as necessary (or unconditionally) during the period the engine starting condition is satisfied.

In the example described above, the minimum operation voltage (e.g., minimum operation voltage at minimum temperature of the usable range) in the usable range of the ambient temperature (e.g., −40 to 85 degrees by way of example) is assumed (e.g., 10 V) as the minimum operation voltage of the starter relay, so that the step-up start voltage (first voltage value) is determined to be slightly lower (approximately 1 to 2 V lower), the step-up start voltage (second voltage value) is determined to be slightly higher (approximately 1 to 2 V higher), and the first voltage value and the second voltage value are set as the constant value. In this case, the step-up start voltage is set as a constant value irrespective of the change in ambient temperature, and thus the temperature measurement is not necessary, the configuration is simple, and the low cost is achieved.

However, the present invention is not limited thereto, and the following modes may be adopted. In other words, on the assumption that the temperature sensor (not shown) is arranged in the interior or the exterior of the control unit 1 and the storage unit (not shown) (storing data of the minimum operation voltage that changes by the temperature of the starter relay) is arranged in the control unit 1, the current temperature is detected, the minimum operation voltage data of the starter relay at the relevant temperature is read out, the step-up start voltage (first voltage value) at the relevant temperature is determined so as to be slightly lower (approximately 1 to 2V lower) than such value, the step-up start voltage (second voltage value) is determined so as to be slightly higher (approximately 1 to 2V higher) than such value, and the first voltage value and the second voltage value appropriately change the set value depending on the ambient temperature. In this case, fine control can be performed, the frequency of unnecessary step-up operation can be further reduced, and longer lifespan of the battery can be achieved.

What is claimed is:

1. An engine starting device for controlling an engine start of a vehicle by driving a starter relay of the vehicle with a battery of the vehicle as a power supply, the engine starting device comprising:

a control processing unit, and a step-up circuit for stepping up the output of the battery and outputting a drive voltage for driving the control processing unit and the starter relay;

wherein the control processing unit has a function of performing an engine start control of applying the drive voltage to the starter relay to activate the starter relay in time of the engine start at which an engine starting condition is satisfied; and wherein the control processing unit performs a control function on the step-up circuit to:

activate the step-up circuit so that the drive voltage does not become lower than a minimum operation voltage of the starter relay in a predetermined period necessary to start the engine in time of the engine start, and activate the step-up circuit so that the drive voltage does not become lower than a first voltage value higher than a minimum operation voltage of the control processing unit and lower than the minimum operation voltage of the starter relay when not in the predetermined period controlling the step-up circuit of executing a step-up operation for stepping up the output of the battery when the drive voltage becomes smaller than or equal to a step-up start voltage, and stopping the step-up operation when the drive voltage becomes greater than the step-up start voltage;

switching the step-up start voltage of the step-up circuit between a first voltage value, which is higher than a minimum operation voltage of the control processing unit and lower than a minimum operation voltage of the starter relay, and a second voltage value which is greater than or equal to the minimum operation of the starter relay; and performing a step-up switching control of having the step-up start voltage as the first voltage value when not in the predetermined period necessary to start the engine in time of the engine start, and switching the step-up start voltage to the second voltage value in the predetermined period.

2. The engine starting device according to claim 1, wherein a starting time of the predetermined period is one of a time point at which the engine start control is started and a time point at which the engine starting condition is satisfied; and an ending time of the predetermined period is one of a time point at which the start of the engine is recognized, a time point at which the engine start control is stopped, a time point at which the engine starting condition becomes not satisfied from satisfied, and a time point at which a set time has elapsed from the starting time of the predetermined period.

3. The engine starting device according to claim 1, wherein the step-up circuit includes an ON terminal for inputting a signal voltage for permitting the step-up operation, and executes the step-up operation when the signal voltage applied to the ON terminal becomes smaller than or equal to a predetermined voltage value and stops the step-up operation when the signal voltage becomes greater than the predetermined voltage value;

a step-up control circuit for applying a voltage obtained by voltage dividing the drive voltage output by the step-up circuit to the ON terminal as the signal voltage is arranged;

the step-up control circuit includes a first resistor connected between a drive power supply line applied with the drive voltage and the ON terminal, a second resistor connected between a low potential side power supply line connected to a negative pole of the battery and the ON terminal, and a third resistor and a switching element sequentially connected in series between the low potential side power supply line and the ON terminal so as to be in a parallel relationship with the second resistor;

when the switching element is turned OFF, a first voltage divided state is obtained in which the drive voltage is voltage divided by the first resistor and the second resistor so that the signal voltage becomes the predetermined voltage value when the drive voltage is at the first voltage value, when the switching element is turned ON, a second voltage divided state is obtained in which the drive voltage is voltage divided by the first resistor, the second resistor, and the third resistor so that the signal voltage becomes the predetermined voltage value when the drive voltage is at the second voltage value; and the control processing unit controls the ON/OFF state of the switching element to switch the step-up control circuit to the first voltage divided state or the second voltage divided state, thereby switching the step-up start voltage to the first voltage value or the second voltage value realizing the step-up switching control.

4. The engine starting device according to claim 2, wherein the step-up circuit includes an ON terminal for inputting a signal voltage for permitting the step-up operation, and executes the step-up operation when the signal voltage applied to the ON terminal becomes smaller than or equal to a predetermined voltage value and stops the step-up operation when the signal voltage becomes greater than the predetermined voltage value;

a step-up control circuit for applying a voltage obtained by voltage dividing the drive voltage output by the step-up circuit to the ON terminal as the signal voltage is arranged;

the step-up control circuit includes a first resistor connected between a drive power supply line applied with the drive voltage and the ON terminal, a second resistor connected between a low potential side power supply line connected to a negative pole of the battery and the ON terminal, and a third resistor and a switching element sequentially connected in series between the low potential side power supply line and the ON terminal so as to be in a parallel relationship with the second resistor;

when the switching element is turned OFF, a first voltage divided state is obtained in which the drive voltage is voltage divided by the first resistor and the second resistor so that the signal voltage becomes the predetermined voltage value when the drive voltage is at the first voltage value, when the switching element is turned ON, a second voltage divided state is obtained in which the drive voltage is voltage divided by the first resistor, the second resistor, and the third resistor so that the signal voltage becomes the predetermined voltage value when the drive voltage is at the second voltage value; and the control processing unit controls the ON/OFF state of the switching element to switch the step-up control circuit to the first voltage divided state or the second voltage divided state, thereby switching the step-up start voltage to the first voltage value or the second voltage value realizing the step-up switching control.

* * * * *